United States Patent Office 3,671,162
Patented June 20, 1972

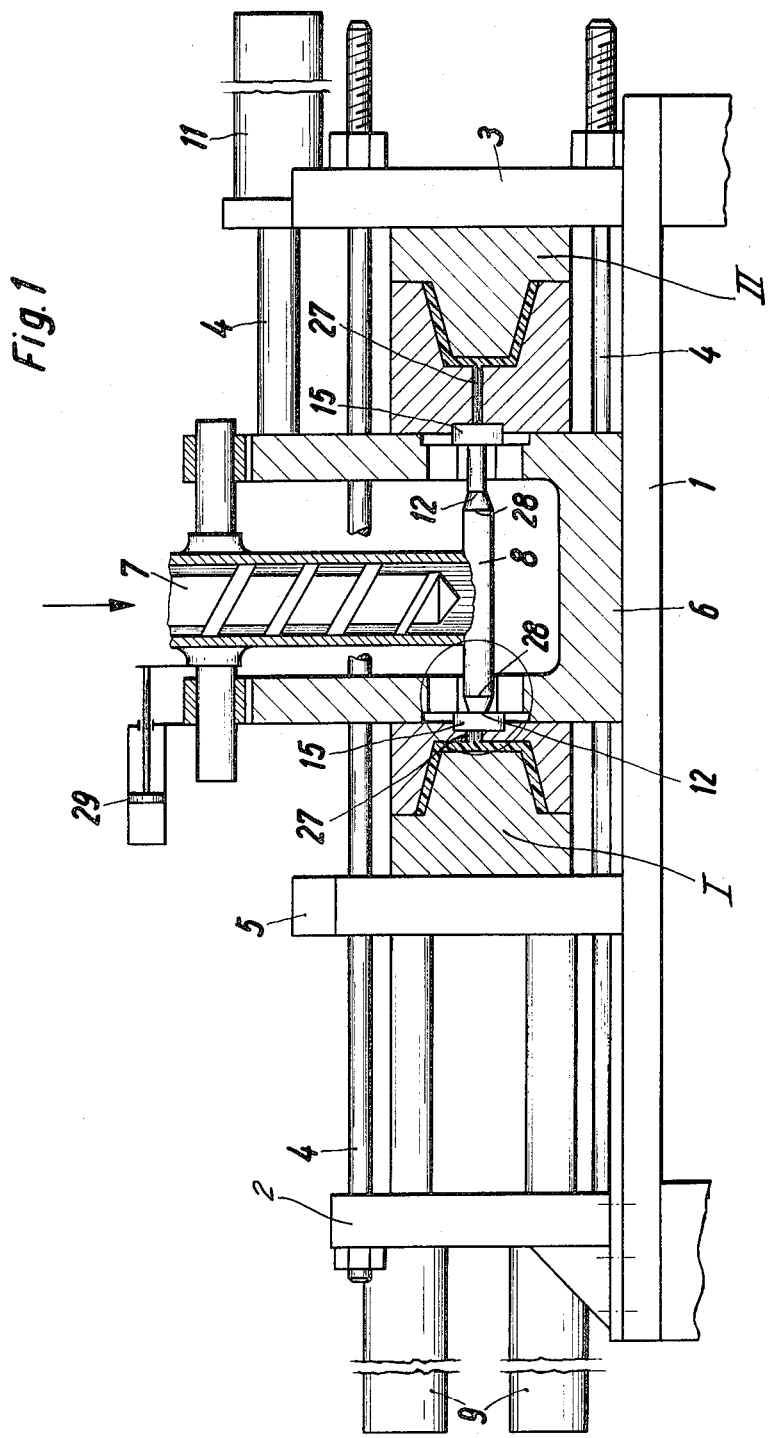

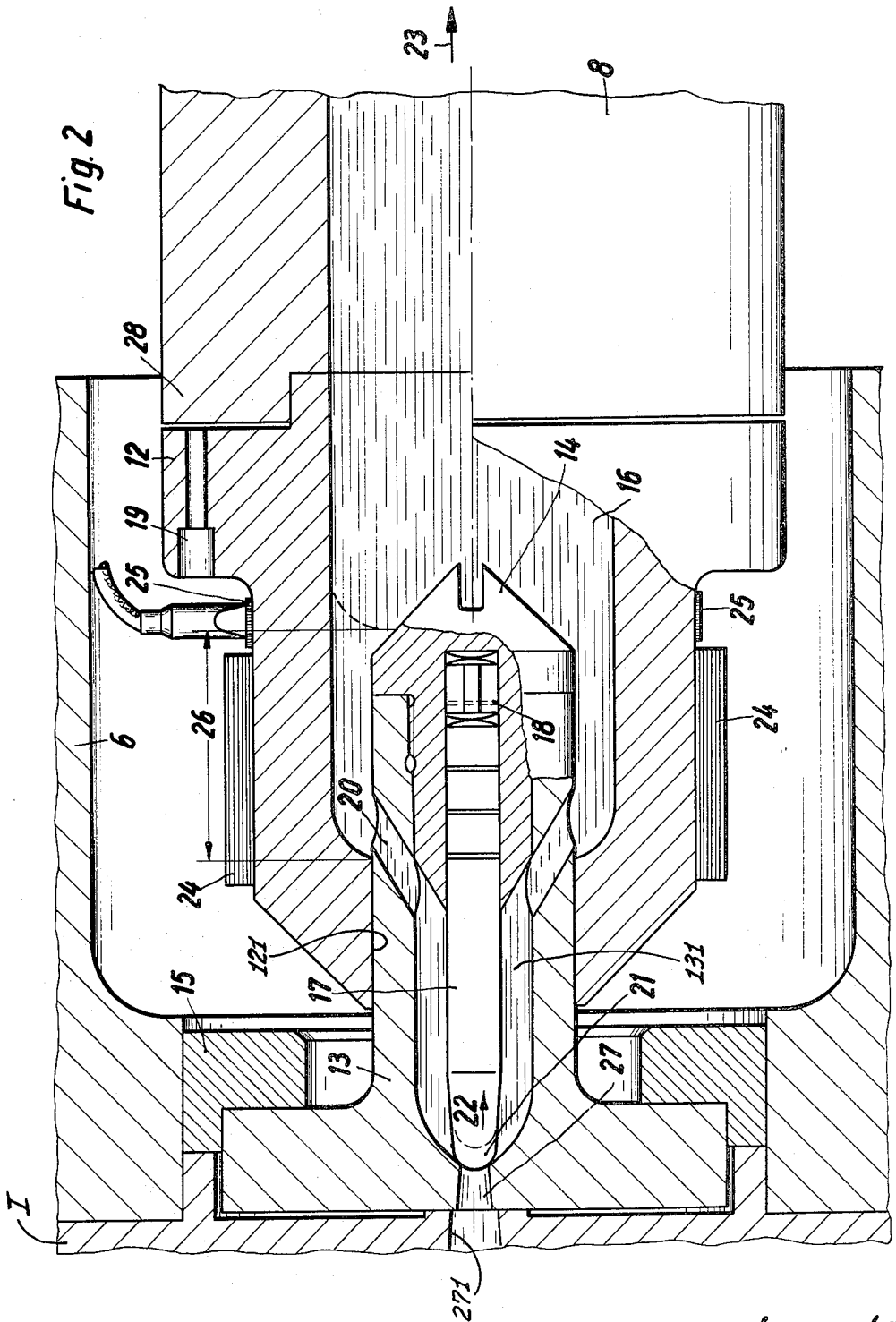

3,671,162
NOZZLE CONSTRUCTION FOR INJECTION MOLDING MACHINES
Albert Lohmann, Niederkruchten, Germany, assignor to Mannesmann-Meer Aktiengesellschaft, Monchen-Gladbach, Germany
Filed Apr. 26, 1971, Ser. No. 137,583
Int. Cl. B29f 1/03
U.S. Cl. 425—245                                2 Claims

ABSTRACT OF THE DISCLOSURE

An injection molding machine with two molds are filled in tandem operation by a common injection unit with a distributor and two nozzles. These nozzles are constructed in that tubular nozzle torpedoes extend from each mold sprue and are telescopically received by heads on the distributor, opening and closing channels in the nozzle torpedoes in dependence upon the position of the injection unit between the two molds. Spring biased stopper pins in the torpedoes open and close the sprues in dependence upon pressure within the torpedoes. That pressure develops in dependence upon channel opening and closing.

---

The present invention relates to a closable injection nozzle for injection molding machines for synthetics. More particularly, the invention relates to improvements in the nozzle construction for tandem injection molding machines as used for molding thick-walled parts of foamable thermoplastics. A tandem machine of the type to be improved in accordance with the invention, is shown in German Pat. No. 1,124,235.

The known injection molding machine could be used to provide controlled filling of the molds with a thermoplastic. However, this machine is not suitable for injection molding of a thermo-plastic that contains a foaming agent. In such a case, an accurately metered quantity of stock material must be maintained at high pressure prior to injection, and the mold cavity must then be filled with shot at great speed. Rapidity of filling is of the essence, as the pressure drops. The other nozzle, on the opposite side of the tandem arrangement, must remain closed throughout this procedure.

The known machine has radial bores in a so-called nozzle torpedo, and as the bores begin to open, the material can already begin to flow into the mold. However, the bores are only partially open in that initial phase of opening a passage into the mold cavity, and that provides severe throttling in the flow of the stock so that the pressure in that portion of the material already in the mold drops prematurely, and the foaming agent expands prematurely accordingly. As a consequence, the texture of the molded casting is not uniform, and the physical consistency of parts that foamed prematurely differs from portions having resulted from injection of material at fully open nozzle.

In a paper published in "Der Plastverarbeiter," 1961, issue 11, page 500, a slide nozzle is disclosed combined with a locking pin. Such a nozzle fulfills the requirement of remaining closed until sufficient pressure in an antechamber has developed. However, that particular known nozzle construction is not suitable for tandem machines as the slide member is loosely positioned in the nozzle chamber. Anticyclic operation of the tandem machine requires mutually dependency of operation of the nozzles which is not possible when parts are loosely disposed.

Therefore, the particular problem exists to find closable nozzle construction, particularly for tandem injection molding machines, permitting particularly injection molding of foamable thermo-plastic material for casting thick-walled parts. The tandem operation provides alternating charging and cooling periods for the two molds in alternating, anticyclic sequence. There is to be a distributor for the material with two nozzles, one each per mold, and the distributor alternates in position for charging one or the other mold, each mold filling being preceded by a loading and metering cycle to fill the distributor with a new accurately metered charge, under high pressure. High pressure is to be maintained in the stock until injected into one mold through the associated nozzle, suddenly and at great speed, while the other nozzle remains closed.

In accordance with the preferred embodiment of the invention, it is suggested to construct each nozzle as follows. A nozzle torpedo is secured to the entrance to the mold, particularly at the sprue through one mold half. The nozzle torpedo has overall configuration of a hollow cylinder, including a bore as sprue extension. The injection unit is provided on that end with a head having a tip or front end portion provided with bore for telescopically receiving and sealing the nozzle torpedo in gliding engagement therewith. The head bore opens into and merges with a wider collection chamber, disposed more in the interior of the head; the hollow nozzle torpedo projects into that chamber but is closed by a closing member except for radial channels. The channels of the nozzle torpedo are closed or open, depending upon the relative position between head and torpedo. They are closed by the bore wall of the head as long as the head is receded for the latter wall to cover the channels. The channels are opened to communicate with the collection chamber upon axial displacement of the head, *towards* the mold half to which the particular nozzle torpedo is mounted. The torpedo has enlarged interior chamber into which lead the channels, and a spring biased locking or stopper pin is received therein. The pin head closes the entrance of the bore (sprue) to the mold cavity, unless excess pressure prevails inside of the torpedo, particularly through the channels when in communication with the collection chamber; this condition prevails only shortly after the channels have been opened.

The inventive combination, therefor, provides for a position and pressure responsive nozzle control and is deemed to be the only way for having two such nozzles operate in the tandem and anticyclically. The channels are opened and closed (anticyclically for the two nozzles) in dependence upon lateral displacement of the distributor relative to the two mold halves through which the mold cavities are filled. That opening is a more or less gradual process. However, the pin opens passage through the sprue and into the mold only, when the internal chamber of the nozzle torpedo communicates with the collection chamber through channels after they have been completely opened; only then will there be sufficient pressure to overcome spring bias of the backing pin which will recede axially from the sprue rather suddenly, for instantly opening passage into the sprue, so that the charge enters the mold without throttling and at great speed. The pressure in the material, as filling the mold, will drop uniformly resulting in uniform expansion of the foaming gases to produce uniform texture throughout the molded casting. Each nozzle works per se independently but mutual dependency is assured as response is dependent upon position of the distributor with its two heads riding on two nozzle torpedos in phase opposition.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a somewhat schematic longitudinal section view of an injection molding machine as improved in accordance with the preferred embodiment of the invention; and FIG. 2 is an enlarged section view of one of the nozzles, as encircled in FIG. 1.

Referring now to the drawings in detail, a support structure 1 serves as a track for two carriages and includes upright support members 2 and 3 at the opposite ends respectively of the structure with a plurality of longitudinal guide rods anchored at their opposite ends in the two upright members. An auxiliary carriage 5 with movable platen and a main carriage 6 slide on the guide rods 4 for the purpose of opening and closing two molds designated I and II.

The main carriages 6 is U-shaped as viewed in side elevation with two upright end walls respectively serving as movable platen; one half of mold I is mounted on one platen of main carriage 6, and one half of mold II mounted on the other platen. An injection unit 7 has a distributor 8 that terminates in two opposite nozzles. The unit 7 with distributor 8 is shown in FIG. 1 in position for charging mold I, and is movable independently of the main carriage, in opposite directions to fill the two molds alternately. A piston-cylinder arrangement 29 provides for lateral displacement of unit 7. The second half of mold I is mounted on the auxiliary carriage 5 in position to mate with the first half of mold I on the main carriage. In like manner the second half of mold II is mounted on the vertically adjustable upright support 3 or stationary platen, and having a position to mate with the first half of mold II on the main carriage.

Two fluid-pressure-actuated power cylinders 9 are mounted on the upright support 2 for the purpose of actuating the auxiliary carriage 5 and, in like manner two fluid-pressure-actuated power cylinders 11 are mounted on the upright support member 3 to actuate the main carriage 6.

The overall operation of the tandem injection apparatus is described in detail in my copending application, Ser. No. 100,234, filed Dec. 21, 1970. The present invention relates to nozzle structure and detail and is best explained as an improvement of that tandem injection apparatus, and overall operation as to the tandem mode and phasing particulars can be taken from that prior application. I now turn to the description of the encircled portion of FIG. 1, as illustrated in FIG. 2.

The distributor has two nozzles connecting pieces 28, one on each end, but FIG. 2 illustrates only one in greater detail. A head 12 is secured to end piece 28 by means of bolts (not shown). The head has a tapered end as facing the mold, and a longitudinal bore 121 is provided in that tapered end. The head is received in a recessed portion in the platen of carriage 6 that carries the one half of mold I. A tubular element 13, also called a nozzle torpedo, has a flange by means of which it is pressed into the one half of mold I through flange ring 15. The nozzle torpedo projects into the recessed portion of the one platen of carriage 6. Moreover, nozzle torpedo 13 is telescopically but sealingly received in that bore 121 of head 12, and is permitted to axially ride and slide thereon. A bore 27 connects the interior chamber 131 of the torpedo with the entrance opening or sprue 271 of the mold. Bore 121 in the tapered end of head 12 merges into a wide collection chamber 16, surrounding the nozzle torpedo 13 as well as a closing element 14 thereof, sealingly bolted to the nozzle torpedo. Chamber 16 communicates with the interior of distributor 8.

Nozzle torpedo 13 is provided with plural, slanted, but radially extending bores or channels 20 for connecting chamber 16 with the interior 131 of the nozzle torpedo. The closing element 14 has a blind bore receiving one end of a locking pin 17 which traverses chamber 131 and extends with its rounded stopper tip towards bore or sprue extension 27. A plurality of cup springs 18 biases pin 17 and urges the tip thereof towards bore 27 to close the passageway into the cavity of mold I. The spring pressure is adjusted to balance a particular internal pressure in the mold (as acting on the pin tip), which is considerably lower than the high pressure needed to prevent a foaming agent from premature expansion prior to injection. Thus, pressure in excess of that adjusted balance readily lifts the pin tip off bore 27.

The head 12 includes additionally heating bands 24 to prevent residue in chamber 16 from solidifying. A thermo element 25 monitors temperature to obtain control of the heater.

The apparatus, as described, and particularly the injection nozzle construction operates as follows. It is important to note, that operation depends only on relative position of injection unit 7 within carriage 6, not on the relative position of the carriage on support structure 1. Prior to injection and filling of mold I, head 12 and distributor 8 have position which is displaced to right with reference to the illustrated position (arrow 23). Two different positions are to be considered here. As long as filling of mold II proceeds through the nozzle on the opposite nozzle of distributor 8, the displacement is about for a full stroke length, as indicated by 26. The distributor 8 has a central position during charging of unit 7, and both nozzles are to be closed in that position, which is in the middle of stroke range 26. To state it differently, the nozzle illustrated in FIG. 2 must be closed when unit 7 with distributor 8 has position for filling mold II or when in central position for charging the injection unit.

Nozzle closing refers in particular to a relative position of parts in which the cylindrical wall of bore 121 closes and covers the entrances to channels 20 and seals the same. Chamber 16 and the interior of the injection unit including the distributor 8 as communicating with chamber 16, are under high pressure of the plastic stock, particularly during charging of the injection unit 7. In order to inject that plastic into mold I, injection unit 7 with distributor 8 and head 12 is moved to the left, by operation of control cylinder 29, to assume the illustrated position of FIG. 2.

As head 12 moves to the left, channels 20 are opened and injection material is forced into chamber 131 to fill same. The pressure of that material is considerably higher than the spring pressure that keeps the head or tip of pin 17 seated on bore 27, so that the pin is readily lifted off the bore (direction of arrow 22). As indicated by dotted line and double arrow 21, the opening stroke is for about that distance. Due to gross imbalance of the pressure-spring-force relation, pin 17 is lifted quite rapidly off bore 27, and the metered injection material is forced into the cavity of mold I through fully open bore 27 at great speed, without undue throttling. Now, the usual expansion of the foaming gases, followed by solidification, takes place, the latter under reduced pressure so that pin 17 closes the entrance to bore 27.

Distributor 8 and head 12 move to the right, subsequently to injection and filling of mold I and as the content of mold I solidifies. Heater 24 prevents the content of chambers 16 and 131 from solidifying. It is readily apparent, that the other end of distributor 8 is provided with a head similar to head 12 and there is a mirror image-like nozzle construction accordingly, operating anticyclically to the one described.

Bores 20 are closed as soon as the distributor 8 has central position, so that both nozzles are in fact closed and sealed from the interior of distributor 8 which can be recharged with a metered quantity of plastic material.

The movable platen-carriage 6 is displaceable as a whole by operation of cylinder on motors 9 and 11, but injection unit 7 with distributor 8 is independently operable by means of cylinder-piston device 29, so as to obtain selective filling of one or the other mold. It is an important feature that the nozzles themselves are controlled directly through the displacement of injection unit 7-8 and through the particular cooperation of the respective heads 12 and stationary nozzle torpedoes 13, as resulting from mutual displacement as described. The nozzles and their closing pins do not require additional control operation.

The nozzle construction in accordance with the invention satisfies the requirement that a predetermined charge of plastic with foaming agent included is maintained at a pressure in excess of 100 atmospheres prior to injection. The accurately metered quantity, e.g., of 8 liters plastic, must and can be injected into the mold within about 0.7 second.

The invention is not limited to the embodiments described above but all changes and modifications thereof not constituting departures from the spirit and scope of the invention are intended to be included.

I claim:

1. In an injection molding machine having a movable platen for support of a mold half with a sprue opening, and having an injection unit independently movable relative to the platen, the improvement comprising:

a tubular nozzle torpedo having a bore and an enlarged, elongated chamber and being secured to the platen, the bore in communication with the sprue opening of the mold half;

a head on the injection unit, having a bore in a frontal portion and a wider chamber to the rear thereof, communicating with a chamber in the unit that receives the material to be injected;

the head disposed for the bore to telescopically receive the nozzle torpedo and to ride thereon upon relative displacement of the injection unit in axial direction;

the nozzle torpedo provided with channels interconnecting the chambers of the nozzle torpedo and of the head in a first relative position of the head, while the bore of the head closes and seals the channels from the chamber in the head in second relative positions; and a spring biased stopper pin disposed in the nozzle torpedo, having a tip sealingly engaging the entrance of the bore of the nozzle torpedo unless pressure in the torpedo chamber exceeds the spring bias.

2. The improvement as in claim 1, wherein the injection unit includes a distributor for cooperation with two molds operated in tandem, the distributor having two of said heads, each constructed as and one being said head, each mold having one said nozzle torpedoes with stopper pin.

References Cited

UNITED STATES PATENTS 3,052,925   9/1962   Bronnenkant _____ 18—30 NB X

FOREIGN PATENTS 1,124,235   1962   Germany _____ 18—30 PS
1,195,041   1965   Germany _____ 18—30 NS
1,930,518   1970   Germany _____ 18—30 NS J. SPENCER OVERHOLSER, Primary Examiner D. S. SAFRAN, Assistant Examiner U.S. Cl. X.R.

425—4, 817